United States Patent

Stoll et al.

[11] Patent Number: 4,755,014
[45] Date of Patent: Jul. 5, 1988

[54] REFRACTIVE OPTICAL WAVEGUIDE INTERFACE AND LENS

[75] Inventors: Harold M. Stoll, Rancho Palos Verdes; Richard L. Davis, Redondo Beach, both of Calif.

[73] Assignee: Northrop Corporation, Hawthorne, Calif.

[21] Appl. No.: 876,951

[22] Filed: Jun. 20, 1986

[51] Int. Cl.$^4$ ............................................... G02B 6/10
[52] U.S. Cl. .................................. 350/96.12; 350/96.11
[58] Field of Search ........................... 350/96.11, 96.12

[56] References Cited

U.S. PATENT DOCUMENTS 4,141,621 2/1979 Aagard et al. .................... 350/96.12
4,606,602 8/1986 Unger et al. ..................... 350/96.12

Primary Examiner—John Lee
Assistant Examiner—Michael Menz
Attorney, Agent, or Firm—Terry J. Anderson; Robert B. Block

[57] ABSTRACT

An integrated optical waveguide structure which provides for efficient, single-mode propagation of light across an interface between two contiguous waveguide layers of differing effective refractive index. The waveguides are formed by layers of increased index of refraction formed at the surface of a substrate and serve to support propagation of optical electromagnetic radiation along the surface of the substrate. A refractive interface is provided at the interface of two such surface layers supporting modes of differing effective indexes of refraction. By underlying one of the surface layers with an additional layer having a particular, but different, index of refraction, a single mode of propagation is supported throughout both of the surface waveguides. General applications in the formation of optical waveguide components as well as a more extensive treatment with the formation of a lens is also disclosed using proton exchange in crystalline $LiNbO_3$.

3 Claims, 4 Drawing Sheets

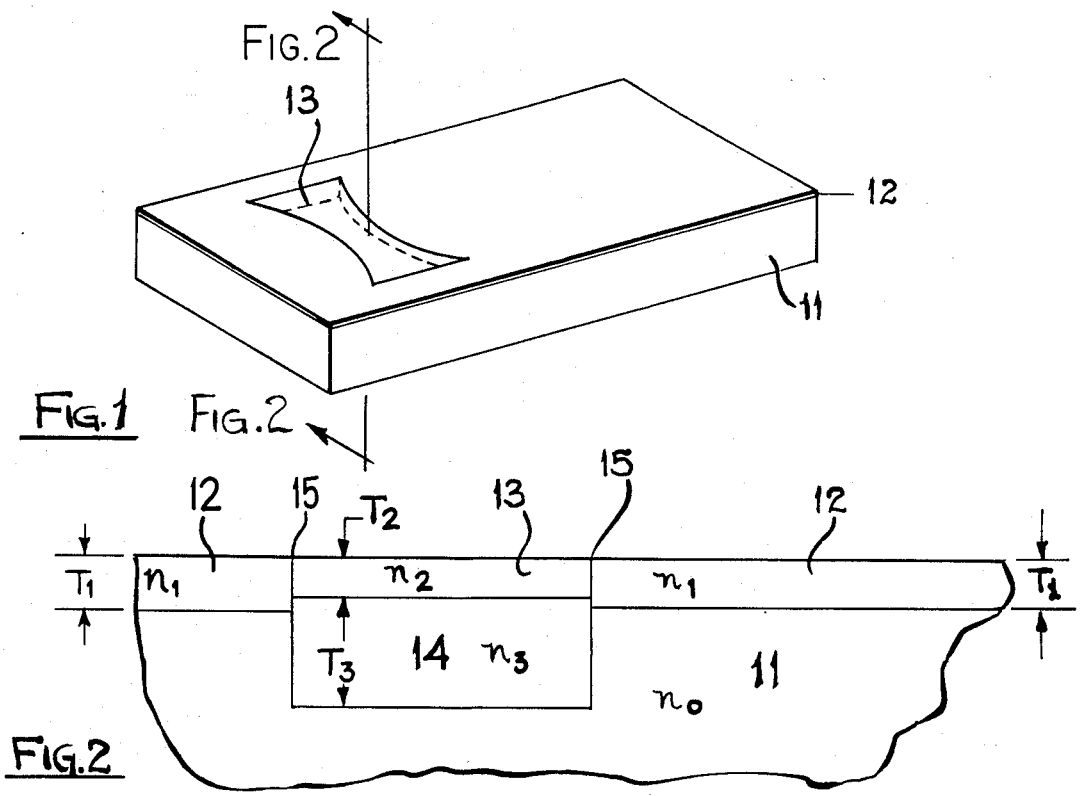
Fig.1
Fig.2
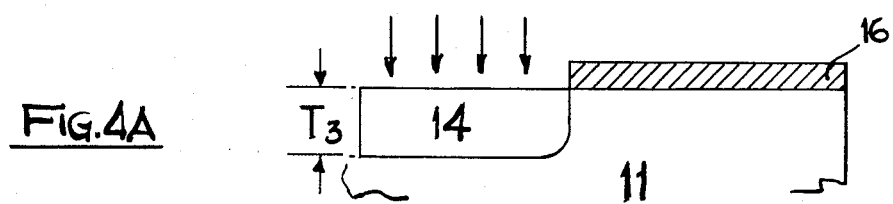
Fig.4A
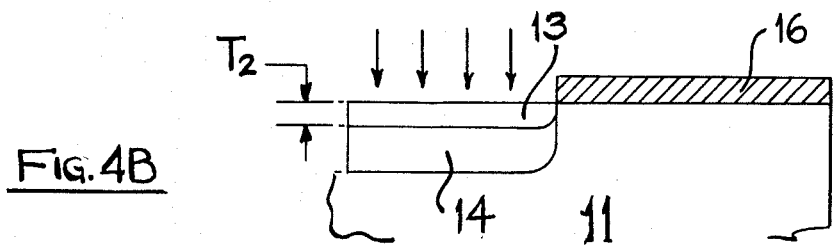
Fig.4B
Fig.4C

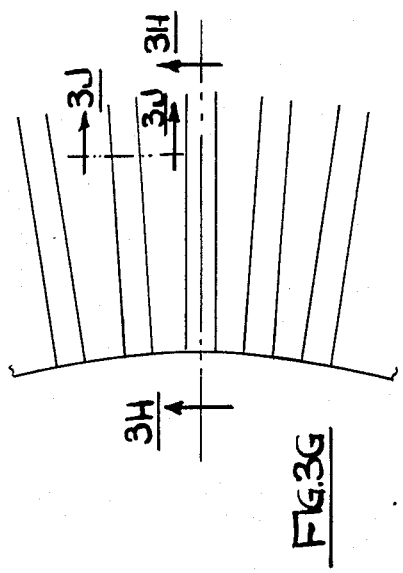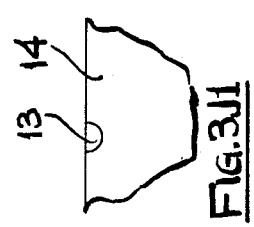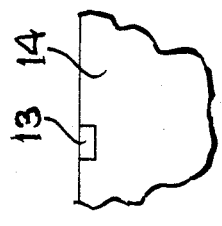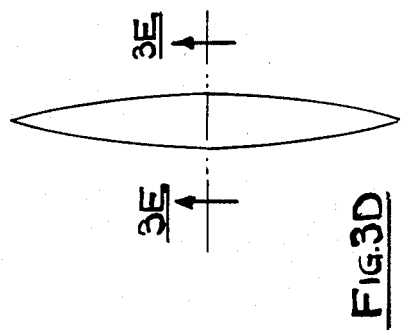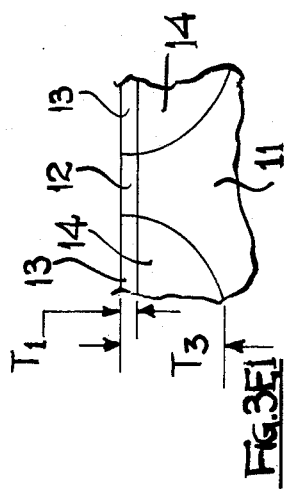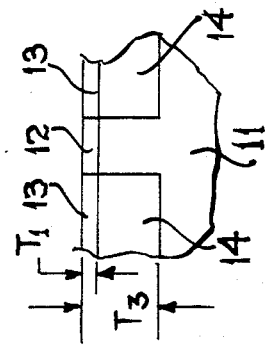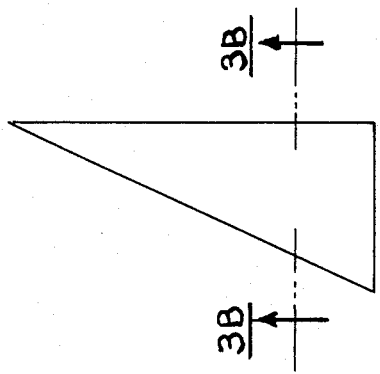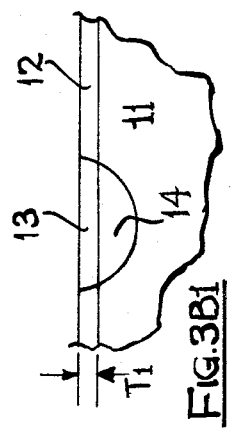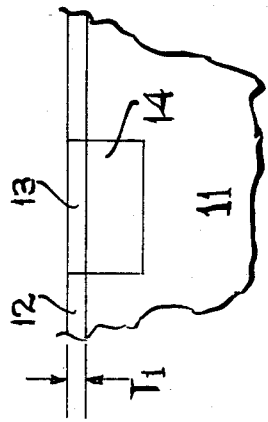

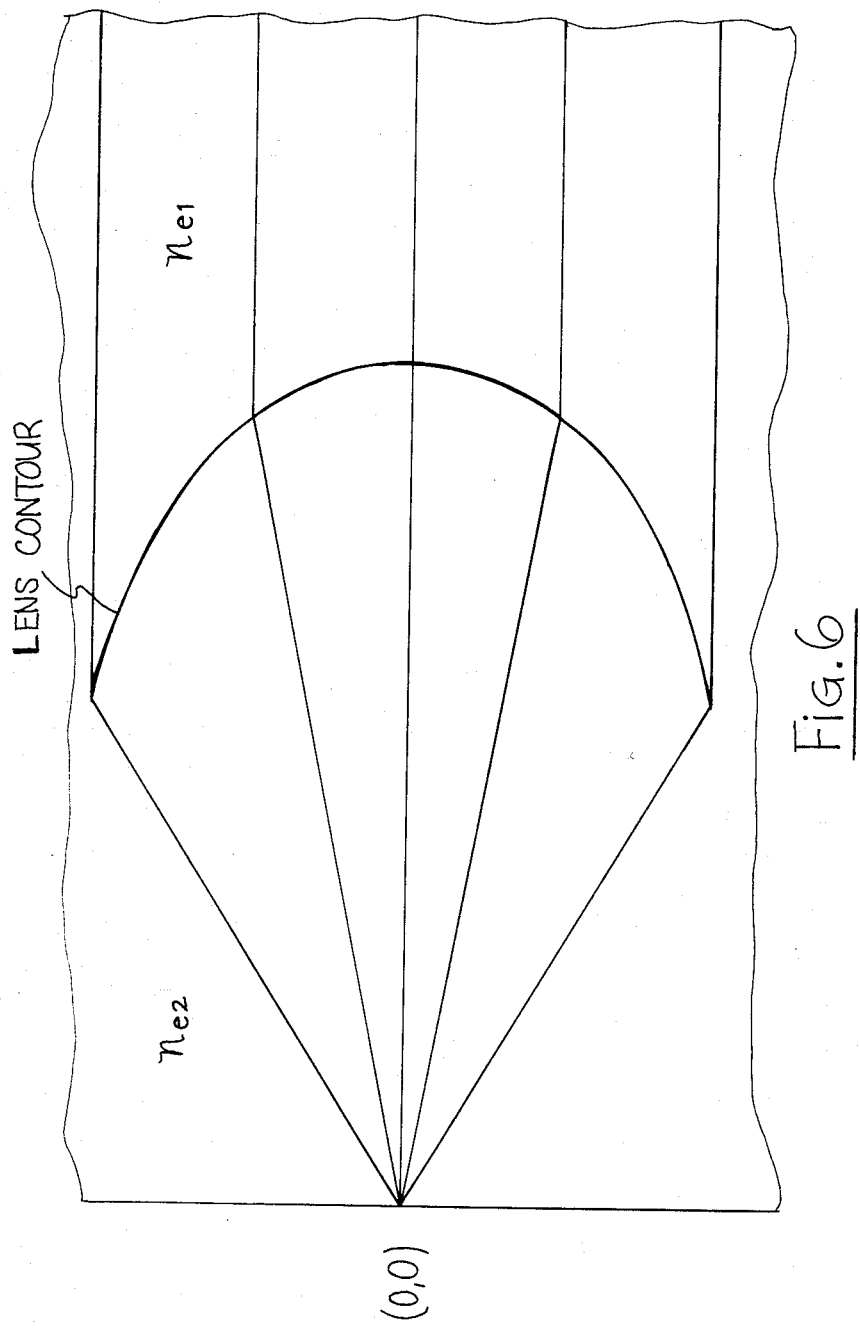

REFRACTIVE OPTICAL WAVEGUIDE INTERFACE AND LENS

BACKGROUND OF THE INVENTION

This invention pertains to optical waveguides, lenses, and other devices formed on the surface of a substrate which use refractive interfaces having differing optical indexes of refraction.

DESCRIPTION OF THE PRIOR ART

The manipulation of light within integrated optical devices fabricated on the surface of a dielectric substrate frequently requires the use of refractive optical elements such as lenses and prisms. In some circumstances, devices also require a planar-to-channel optical waveguide fan-out. In all such cases, the waveguiding structure must be designed for the propagation of a single mode in order to avoid significant insertion losses due to inadvertent mode conversion within or at the boundaries of the refractive optical element in question.

Tien, Martin and Smolinsky, in "Formation of Light-Guiding Interconnections in an Integrated Optical Circuit by Composite Tapered Film Coupling" Appl. Opt., 12, p. 1909 (1973) have proposed a tapered-film coupler, and Sopori, Chang and Phillips, in "A new method for the Efficient Interconnection of High-Index Planar Waveguides to Low Index Transitional Waveguides," Appl. Phys. Lett., 29, p. 800 (1976) have proposed a transitional interface. While both of the proposed structures can, in principle, be used to realize planar refractive waveguide interfaces, neither structure is amenable to achieving the curved or non-parallel interfaces required to fabricate waveguide lenses, prisms, and planar-channel waveguide fan-outs on the surface of a substrate. By way of example, lithium niobate is widely used as an integrated optics substrate because of the ease of fabricating good quality waveguides on its surface and its excellent piezoelectric, electro-optic, and acousto-optic properties. The major drawback associated with the use of this material is the fabrication of high quality waveguide lenses. Many techniques have been utilized to produce lenses in lithium niobate based waveguides with mediocre results at best and include the geodesic lens which requires non-planar processing technology and the Luneburg lens which requires sputter processing of high accuracy. Neither of these lens systems has been adequate for optical processing applications on lithium niobate substrates due to expensive fabrication or limitations of materials.

Another type of lens is the diffractive lens, examples of which are the Fresnel lens and the Bragg grating lens. These lenses, like the Luneburg lens, are quite compatible with planar processing techniques. Their main drawback is that their off-axis performance is compromised more severely than the other types of lenses through degradation of focused spot size, increased side lobe levels, and reduction in the overall lens diffraction efficiency. Little success has been achieved in fabricating the required periodic structures which consistently exhibit the required coupling coefficient for optimum lens performance. Zang De Yu in "Waveguide Optical Planar Lenses in $LiNbO_3$ - Theory and Experiments", Vol. 47, number 4, Optics Communications (Sept. 15, 1983) proposes proton exchange lens formation in lithium niobate using a planar technology but failed to solve the problem of multimode generation and losses at mismatched interfaces. The purpose of this invention is to provide a means for easily fabricating integrated optic waveguide transitions and high quality waveguide lenses using batch, planar processing techniques. Through the application of the interface disclosed herein, these transitions and lenses will exhibit minimal throughput optical loss due to mode mismatch.

SUMMARY OF THE INVENTION

This invention provides a low-loss refractive interface between adjacent waveguiding surface layers on a substrate, the refractive indices and thicknesses of which differ from one another. The invention utilizes a third sub-layer within the substrate having a still different index of refraction, which third layer underlies one of the two surface layers. When constructed as set forth herein, the combination results in a refractive interface which will support the efficient propagation of a single, guided optical mode across the interface between the two surface layers.

Fabrication of the various layers with differing indexes of refraction and thicknesses within the substrate may be accomplished by any of a number of well-known methods. In lithium niobate, the waveguide is produced by the proton exchange process, and provides a specific effective index $n_{e1}$ for the desired mode, and a particular transverse optical field distribution. When the optical wave inpinges on a contiguous region of waveguide whose mode effective index, $n_{e2}$, is either less than or greater than $n_{e1}$, but whose transverse optical field distribution is nearly identical to the previous one, the optical energy will be efficiently transmitted across the boundary between the two regions.

More specifically, the invention consists of a planar waveguide region formed by proton exchange on the surface of a lithium niobate substrate which supports a zeroth order mode whose effective index is $n_{e1}$, and a waveguide region also formed by proton exchange which supports a zeroth order mode whose effective index, $n_{e2}$, is somewhat different from $n_{e1}$. An optical beam propagating in the waveguide is refracted at the $n_{e1}/n_{e2}$ boundary. Optical throughput losses to undesired modes are reduced to a negligible level by fabricating the waveguides in such a manner that the optical zeroth order mode transverse field profiles are nearly identical in both the $n_{e1}$ and $n_{e2}$ regions. This is accomplished by forming a sublayer under one of the regions with a controlled index of refraction $n_3$.

Additionally, the optical beam undergoes refraction at the interface boundary in accordance with Snell's law. For example, waveguide lenses can be made by appropriately contouring the interface boundary, i.e., a diverging beam can be collimated by an elliptical boundary. Multiple refracting interfaces can be used to create higher powered lenses. Spheric and aspheric contours can be generated with equal ease and either may be utilized in a given lens depending on performance requirements. Standard lens analysis procedures can be employed to design and evaluate the performance of the lens.

These and other features of the invention will become apparent from consideration of the following detailed description and claims when taken with the accompanying drawings, of which:

BRIEF DESCRIPTION OF THE DRAWINGS

FIG. 1 is a perspective view of an integrated optical substrate having a surface waveguide layer in which is formed a refractive lens in accordance with the present invention.

FIG. 2 depicts the basic arrangement of the surface waveguide of FIG. 1 taken along the lines 2—2 thereof.

FIGS. 3A, 3D, and 3G are examples of optical devices formed in situ on a surface waveguide layer in accordance with the present invention.

FIGS. 3B1, 3B2, 3E1, 3E2, 3H1, 3H2, 3J1 and 3J2 depict cross-sections of the respective examples of FIGS. 3A, 3D, and 3G.

FIGS. 4A, 4B and 4C depict a method for fabricating an optical component of FIGS. 1 and 2.

FIG. 6 is a single collimating lens contour/interface constructed in accordance with the present invention.

DESCRIPTION OF THE PREFERRED EMBODIMENT

Figure 5:
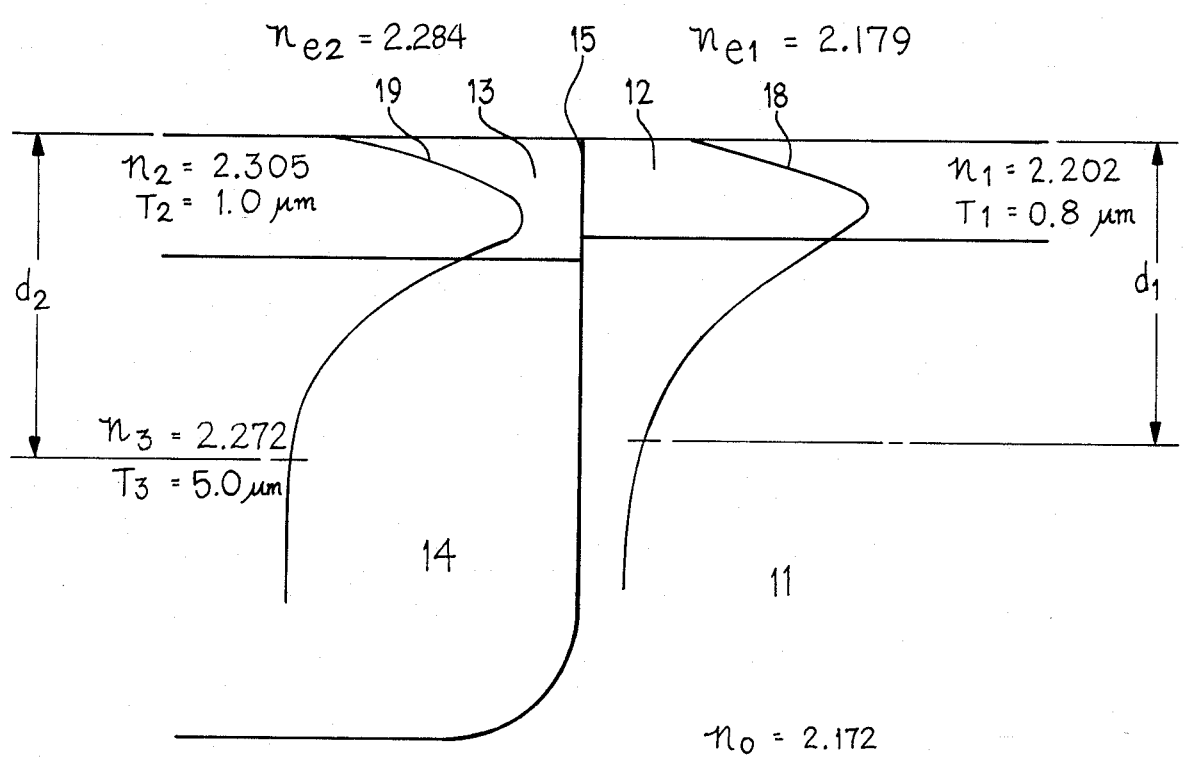
FIG. 5 is a transverse section in the lens/interface of FIGS. 1 and 2 showing the mode distribution profile.

Referring to FIGS. 1–2, a lens or other integrated optical device 13 is fabricated on the surface of a substrate 11 of lithium niobate (LiNbO$_3$) having an index of refraction $n_0$. The substrate 11 is given a thin surface layer 12 of thickness $T_1$ which has an index of refraction $n_1$, greater than that ($n_0$) of the substrate. As a consequence, surface layer 12 supports the propagation of electromagnetic energy at optical wavelengths with an effective index $n_{e1}$. Lens 13 is fabricated on the surface of substrate 11 by forming a lens-shaped layer, in plan view, on the surface of substrate 11 which lens has an index of refraction $n_2$ and thickness $T_2$ different from that ($n_1$ and $T_1$) of layer 12. Since the layer at lens 13 must have an index of refraction $n_2$ different from $n_1$, it normally supports, by virtue of its relationship to the index of refraction of substrate 11, a mode with effective index $n_{e2}$, and a different mode structure than the mode supported by layer 12. For the negative-focal-length lens depicted in FIG. 1, $n_2 > n_1$. Hence, if layer 12 supports only a single optical mode, layer 13 may be expected to support more than one mode, assuming the latter's thickness is approximately equal to that of layer 12 and that both lens layer 13 and layer 12 are supported by a substrate having an index of refraction $n_0$. In accordance with this invention, however, an additional layer 14 is fabricated below lens-shaped layer 13 and is given a still different index of refraction $n_3$, such that layer 13 supports propagation of but a single mode with $n_{e2}$ different than $n_{e1}$, but whose transverse field profile is nearly identical to that of the mode supported by layer 12.

FIG. 2 depicts the refractive interface of this invention in an integrated structure and in detail and shows a substrate crystal 11 as having an index of refraction $n_0$, which index has been modified in layer 12 to have an index $n_1$. Layer 12 is formed at the surface of the substrate and has a thickness $t_1$. Layer 12 is contiguous to and abuts a similar surface layer 13 along common boundary or interface 15. Layer 13 has a different index of refraction $n_2$ and thickness $T_2$. Because of the differences between layers 12 and 13, boundary 15 operates as a refractive interface. In this invention, the thicknesses of layers 12 and 13 are approximately the same.

In practice, in order to obtain a useful refractive boundary 15, the effective index of refraction of layer 13 (the speed of light in vacuo divided by the phase velocity of the guided mode within layer 13) must differ sigificantly from the effective index of refraction of layer 12. If $n_1$ is selected so as to support only a single mode of propagation, then layer 13, being approximately the same thickness as layer 12 but possessing a significantly larger refractive index, normally would support more than one mode of propagation. However, in this invention, the propagation of multiple modes in layer 13 is avoided by fabricating a relatively thick layer 14 beneath layer 13, which layer 14 has an index of refraction $n_3$ that operates in conjunction with the index of refraction of layer 13 to support but a single mode of propagation. The thickness $T_3$ of layer 14 is much greater than $T_2$ so that the propagation of a single mode in layer 13 is substantially unaffected by the remote presence of substrate 11 below layer 14. Moreover, indices of refraction $n_0$, $n_1$, $n_2$, and $n_3$ and thicknesses $T_1$ and $T_2$ are selected so that the transverse electromagnetic field distribution within layer 12 matches as closely as possible the transverse electromagnetic field distribution within layer 13, thereby assuring minimum insertion loss for the transmission of energy across the refractive waveguide interface.

For further evaluation, the transfer efficiency or overlap can be computed from $$\eta = \frac{\left| \int_{-\infty}^{\infty} E_1(x) E_2^*(x) dx \right|^2}{\int_{-\infty}^{\infty} |E_1(x)|^2 dx \int_{-\infty}^{\infty} |E_2(x)|^2 dx} \tag{1}$$

Where $E_1(x)$ is the electric component of the electromagnetic field profile of the mode supported by layer 12 on one side of the boundary, $E_2(x)$ is the electric component of the electromagnetic field profile of the mode supported by the layers 13 and 14 on the other side of the boundary, and x is taken in a direction normal to the layer.

The value of n is the fraction of optical energy transmitted from the zeroth order mode in layer 12 to the zeroth order mode in layer 13. Methods for selecting the values of $n_1$, $T_1$, $n_2$, $T_2$, $n_3$, and $T_3$ that maximize $\eta$ depend on the optical device in which the interface is used. For example, if a waveguide lens is to be fabricated on a lithium niobate substrate by the proton exchange process the key design parameter is the ratio $n_{e2}/n_{e1}$. Well known waveguide theory can be applied to determine $n_1$ and $T_1$ so as to produce a waveguide 12 which supports a single mode with effective index $n_{e1}$ such that $n_{e1}$ is slightly greater than $n_0$. The electric field profile 18 for this mode is determined and $T_3$ is then assigned a value which is greater than the penetration depth $d_1$ of the mode. Since $n_{e2}$ is fixed by the ratio $n_{e2}/n_{e1}$, a set of values for $n_2$, $T_2$, and $n_3$ are selected which yield a waveguide 13 which supports a single mode with effective index $n_{e2}$. There exists an infinite set of combinations of values $n_2$, $T_2$, and $T_3$ which will provide the desired mode index $n_{e2}$, so typically a computer is used to find a particular combination from this set which also provides a waveguide whose mode electric field profile 19 will lead to a value of n arbitrarily close to unity.

FIGS. 3A, D, and G depict a prism, a lens, and a planar-to-channel optical waveguide interface and channel fan-out fabricated on the surface of a substrate using this invention. As indicated in FIGS. 3B1, 3B2, 3E1, 3E2, 3H1, 3H2, 3J1 and 3J2, the shapes of the interfaces within the substrate between the various layers are affected by whether the layers are fabricated by means of exchange, diffusion, or ion implantation. FIGS. 3B1, 3E1, 3H1 and 3J1 depict the cross-sections for ion exchange or diffusion and FIGS. 3B2, 3E2, 3H2, and 3J2 depict the cross-sections for ion implantation.

FIGS. 4A, 4B and 4C illustrate a method for fabricating the invention. As illustrated in step 1, depicted in FIG. 4A, the substrate 11 of lithium niobate is masked by an appropriate mask 16 and then immersed in a bath of moderately buffered benzoic acid (e.g., benzoic acid with dissolved lithium benzoate). The immersion period is selected to yield an exchange depth $T_3$ which is sufficiently greater than $T_2$ so as to isolate the propagating mode in layer 13 from the underlying portion of substrate 11.

In step 2, FIG. 4B, layer 13 is formed by performing a shallow exchange in lightly buffered or unbuffered benzoic acid. After removal of exchange mask 16 and deposition of exchange mask 17, layer 12 then is formed by performing another shallow exchange in heavily buffered benzoic acid. Finally, exchange mask 17 is removed. Techniques for performing such proton exchanges are described by Jackel, Rice & Veselka, in "Proton Exchange for High Index Waveguides in Lithium Niobate", presented at The Topical Meeting on Integrated and Guided Wave Optics, Asilomar, Calif., Jan. 6-8, 1982; by DeMicheli, Botineau, Neveu, Sibillot, and Ostrowsky in "Independent Control of Index and Profiles in Proton-Exchanged Lithium Niobate Guides," Opt. Lett., 8, p. 114 (1983) and by DeMicheli, Botineau, Sibillot, Ostrowsky & Papuchon, in "Fabrication and Characterization of Titanium Indiffused Proton Exchanged (TIPE) Waveguides in Lithium Niobate", Optical Comm. 42, p. 101 (1982).

FIG. 5 illustrates an example of configuration for a waveguide interface with a transmission loss due to optical mode mismatch of less than 1%. A multiple proton exchange process is used to fabricate this interface. This process is illustrated in FIG. 4. Particular values of the various parameters are given in FIG. 5. The optical mode profile 18, with penetration depth $d_1$ is supported by layer 12, and the optical mode profile 19, with penetration depth $d_2$, is supported by layer 13. The optical beam is refracted in the plane of the waveguide at 15, the boundary between layers 12 and 13. The boundary contour is configured to provide the desired lens action.

Referring to FIG. 6, the operation of the invention is illustrated. An optical beam is caused to propagate in a planar proton exchange waveguide from (0,0). As shown, a diverging optical beam is propagating from left to right. It is desired that this beam become collimated. However, the invention is applicable to any situation where it is desired to collimate, focus, or expand a waveguide optical beam. The waveguide in this region is fabricated such that the guided mode effective index is $n_{e2}$ and the mode penetration depth is $d_2$. The optical beam is transmitted into a second waveguide region whose guided mode index $n_{e1}$ is different from $n_{e2}$ but with mode penetration depth $d_1$, nearly equal to $d_2$. This allows for a highly efficient transmission of optical energy across the $n_{e1}/n_{e2}$ interface.

In the case of FIG. 6, $n_2$ is greater than $n_1$ and the diverging beam is collimated by the concave interface boundary between them; and the specific boundary contour depends on the ratio $n_{e1}/n_{e2}$ and the desired lens performance requirements. In general, a lens may consist of one or more refracting boundaries and mode effective indices, two being shown in FIG. 1, and one being shown in FIG. 6.

What is claimed is:

1. An optical waveguide which provides efficient, single-mode propagation across a refractive waveguide interface comprising:

a substrate having a surface and having first, second, third, and fourth portions, said portions having first, second, third and fourth indexes of refraction, $n_0$, $n_1$, $n_2$, and $n_3$, respectively;

the first portion constituting the bulk of the substrate and underlying the second, third and fourth portions;

the second portion comprising a layer located at the surface of the substrate and having a predetermined thickness $T_1$;

the third portion comprising a layer located at the surface of the substrate and having a thickness, $T_2$, approximately equal to $T_1$, the third portion being adjacent to the second portion, and having a first boundary surface therewith, the first boundary surface constituting said refractive waveguide interface;

the fourth portion comprising a layer underlying, and adjacent to, the third portion and having a thickness significantly greater than $T_2$ so that the propagation of a single mode in the third portion is substantially unaffected by the more remote presence of the first portion;

said fourth portion having a second boundary surface with said first portion which is an extension of said first boundary surface;

said thicknesses $T_1$ and $T_2$ and indexes $n_0$, $n_1$, $n_2$, $n_3$ being selected so that single mode, matched mode propagation occurs across said boundary surfaces.

2. An optical waveguide element which provides efficient, single-mode propagation across a spaced pair of refractive waveguide interfaces comprising:

a substrate having a surface and having first, second, third, and fourth portions thereof, said portions having first, second, third and fourth indexes of refraction $n_0$, $n_1$, $n_2$, and $n_3$ respectively;

the first portion constituting the bulk of the substrate and underlying the second, third and fourth portions, the second portion comprising a layer of the substrate located at the surface of the substrate and having a predetermined thickness, $T_1$, and bounded by interfaces with the third portion:

the third portion comprising a layer of the substrate located at the surface of the substrate and having a thickness, $T_2$, approximately equal to $T_1$, the third portion being adjacent to the second portion, and having a pair of spaced boundaries in common therewith, the spaced boundaries constituting a pair of refractive waveguide interfaces for forming a lens;

the fourth portion comprising a layer of the substrate underlying the third portion and having a thickness significantly greater than $T_2$;

said fourth portion having a pair of boundary surfaces with said first portion which are extensions of said spaced boundaries.

3. A method for fabricating an optical waveguide which supports efficient, single-mode propagation across a refractive waveguide interface comprising:

on a substrate having an index of refraction $n_0$, and a surface, forming first, second, third, and fourth portions in said substrate:

said portions having first, second, third, and fourth indexes of refraction $n_0$, $n_1$, $n_2$, and $n_3$ respectively and thicknesses $T_1$, $T_2$, and $T_3$ respectively;

forming said first portion from the bulk of the substrate to underly the second, third, and fourth portions;

forming said second portion as a layer lying at the surface of the substrate with thickness $t_1$;

forming said third portion at the surface of the substrate with thickness $T_2$ approximately equal to $T_1$ such that said third portion is adjacent to the second portion to define boundary and a refractive waveguide interface in common therewith;

fabricating a layer in a fourth portion of the substrate, said fourth portion having an index of refraction $n_3$;

said fourth portion having a second boundary surface with said first portion which is an extension of said first boundary surface;

fabricating a layer constituting a third portion of the substrate at the surface of the fourth portion, said third portion having an index of refraction $n_2$ and having a thickness $T_2$ substantially less than that of the fourth portion;

fabricating a second portion of the substrate having an index of refraction $n_1$, said second portion lying at the surface of the substrate and adjacent to said third portion and having a thickness $T_1$ approximately equal to that of the third portion, the index of refraction of the third portion differing from that of the second portion;

selecting said thickness $T_1$ and $T_2$, and said indexes $n_0$, $n_1$, $n_2$, $n_3$, having been selected to establish matched mode propagation across said boundary surfaces.

* * * * *